Dec. 20, 1966 R. SOBOTTA 3,292,288
PHOTOGRAPHIC SLIDE PROJECTOR
Filed June 1. 1964

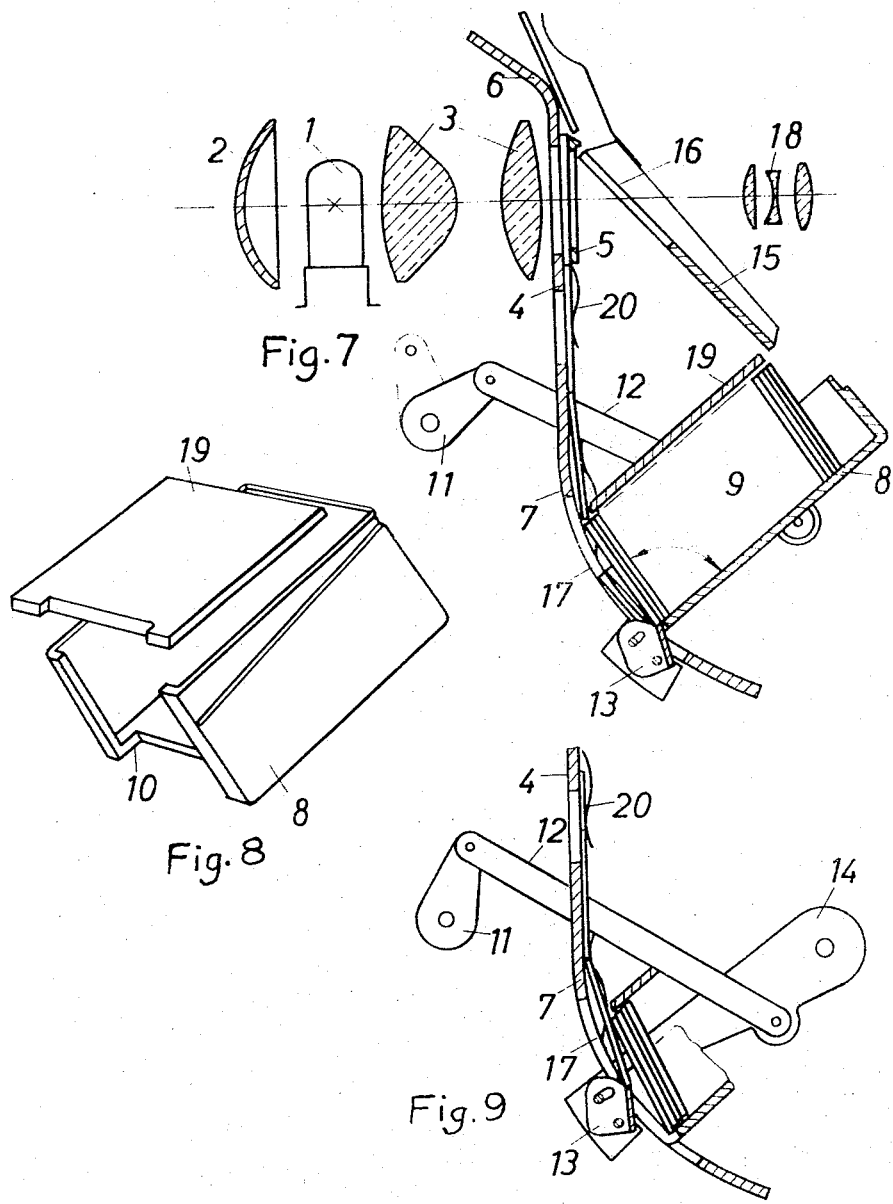

United States Patent Office 3,292,288
Patented Dec. 20, 1966

3,292,288
PHOTOGRAPHIC SLIDE PROJECTOR
Reinhard Sobotta, Braunschweig, Germany, assignor to Rollei-Werke Franke & Heidecke, Braunschweig, Germany, a firm
Filed June 1, 1964, Ser. No. 371,277
Claims priority, application Germany, June 1, 1963, R 35,314
20 Claims. (Cl. 40—78)

This invention relates to a projector for projecting photographic slides or transparencies, and more particularly to a projector of the type in which successive slides are removed from one end of a holder or magazine, moved into projection position, and then after projection are replaced at the opposite or rear end of the stack of slides in the holder or magazine, the stack of slides gradually moving forward in the magazine, so that the projection cycle may be continued indefinitely if desired, the same stack of slides being shown over and over again.

An object of the invention is the provision of a generally improved and more satisfactory projector of this kind.

Another object is the provision of a projector having improved means for returning the projected slide to its proper position in the magazine, and improved means for preventing the stack of slides in the magazine from falling over in case the stack does not approximately fill the length of the magazine.

Still another object is the provision of improved means for keeping the slides which are about to be removed from the magazine in proper alinement, to overcome any tendency of a second slide in the magazine to move partially out of the magazine when the first slide is removed for projection, on account of frictional drag resulting from the movement of the first slide.

These and other desirable objects may be attained in the manner disclosed as an illustrative embodiment of the invention in the following description and in the accompanying drawings forming a part hereof, in which:

FIG. 7 is a schematic vertical axial section through a basic form of projector to which the present invention is applied, giving background information for better understanding of the present invention;

FIG. 8 is a perspective view of a magazine suitable for use with the projector of FIG. 7 and FIG. 9 is a view similar to part of FIG. 7 with the claw mechanism in an intermediate position.

Figure 1:
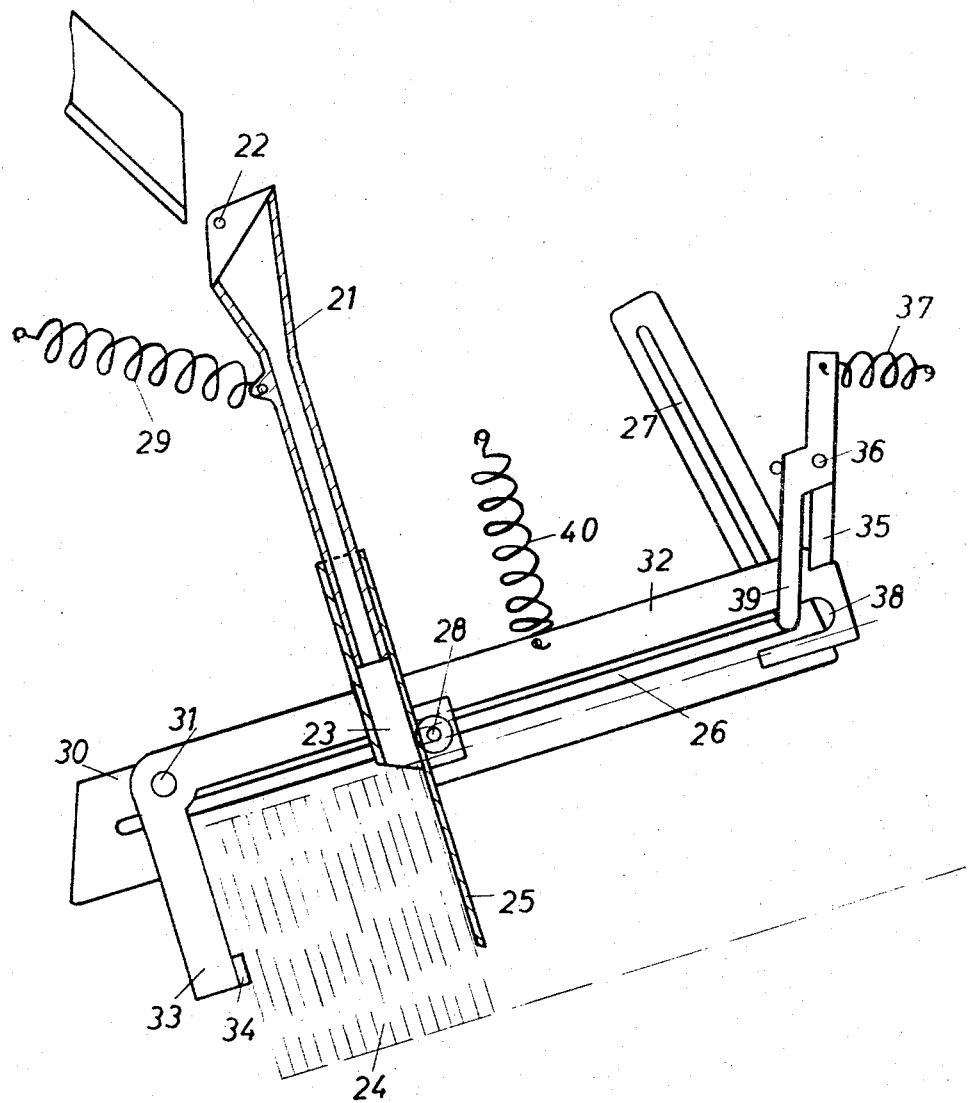
FIG. 1 is a schematic side elevation of mechanism in accordance with the present invention, illustrating the parts in normal operative position with a magazine loaded into the slide changing mechanism.

Referring first to FIG. 7 for a better understanding of the basic kind of projector to which the present invention is applicable, the basic projector includes the usual housing or casing (not shown) containing the usual conventional components of a light source 1, reflector 2, condenser lenses 3, image gate or projection gate formed between two vertical plates 4 and 5 extending transversely of the optical axis and apertured for passage of light, and a rearwardly bent part 6 at the upper end of the vertical plate 4.

The lower part of the plate 4, below the projection aperture itself, is curved forwardly at 7. Suitable guiding or supporting structure of any conventional kind is provided for holding a magazine 8 which may be in the form of a simple open-top box or trough, open also at its forward end except for small inwardly extending flanges at the forward end as seen in FIG. 8. This magazine 8 contains a stack of slides or transparencies as indicated in general at 9. There is a notch 10 in the forward part of the bottom wall of the magazine. The magazine is arranged in the projector at an inclination as seen in FIG. 7, so that the stack of slides constantly tends to feed itself by gravity to the lower front end of the magazine 8 (faced toward the rear of the projector) and the first or end slide is held from falling out the open end of the magazine by the lateral flanges at the front end of the magazine.

An operating crank 11 is connected by a link 12 to a claw lever 14 pivotally mounted in the casing and having a claw 13 at its free end. When the crank 11 is turned in a counterclockwise direction, it pulls on the link 12, pulling the lever 14 in a clockwise direction to raise the claw 13 which comes up through the notch 10 in the magazine, engages the first one of the slides at the front end of the magazine, and raises this slide upwardly along the curved part 7 of the member 4. The slide which is thus being advanced upwardly pushes upwardly on a previous slide which has been fed upwardly during the previous cycle of operation, and this previous slide in turn pushes still another previous slide on upwardly, the feeding motion being continued through as many successive slides as necessary (depending upon the design of the machine) until finally one slide is brought into projection position, lying across the optical axis and held against axial movement between the apertured plates 4 and 5. After this slide has been projected for a sufficient length of time, the next cycle of operation brings a fresh slide into projection position and pushes the previously projected slide on upwardly until the lower edge thereof clears the top edge of the plate 5, whereupon the slide tends to fall over rearwardly on the curved part 6, freeing the lower edge so that the slide falls by gravity down the chute 15 into the rear or upper end of the magazine 8. The chute 15 is apertured at 16 in line with the optical axis, so that the light rays may pass through this aperture 16 to the projection lens system 18, from which the rays are projected onto any suitable screen or receiving surface, as conventional.

There may be a stationary cover 19 over the top of the stack 9 of slides in the magazine 8. This prevents accidental lifting of any slide except the front one which is beyond the front edge of the cover 19. Leaf springs 20 engage the marginal edges of the slides as they travel upwardly along the guide 7, 4 and hold them against the front face of the guide. The claw 13 has a range of travel exactly equal to the height of one slide, so that each time the claw mechanism 11, 12, 13, 14 is operated through a cycle, it moves a slide up through exactly the height of the slide, and the slide in projection position will be properly alined with the projection axis or optical axis.

It is to a projector of the basic construction such as above described, that the present invention is applied. In the basic construction, the chute 15 for returning the slides to the magazine is fixed or stationary. This works well when the stack of slides nearly fills the magazine. But where it is desired to project only a few slides partially filling the magazine, there is danger that the slides returned to the magazine by the stationary chute will fall over in the empty part of the magazine instead of remaining edgewise in upright position. To remedy this difficulty, the present invention provides an improved chute 21 (FIGS. 1 and 2) which is pivoted at 22, to swing back and forth in a direction lengthwise of the magazine. The lower end of the chute has a tubular extension 23 which can move upwardly and downwardly telescopically on the main part of the chute 21, and one wall of this part 23 (the front wall, when speaking with reference to the projector, or the rear wall when speaking with reference to the magazine) is extended downwardly at 25 to overlap the rearmost slide in the stack of slides 24, in the magazine. A spring 29 tends to swing the chute 21 leftwardly when viewed as in FIG. 1, to hold the pressure plate 25 against the rearmost slide 24.

On one side of the magazine, preferably the far side when viewed as in FIG. 1, there is a grooved plate 30 having a longitudinal groove 26 extending in a direction lengthwise of the slide magazine and at an elevation slightly above the top of the stack of slides 24. At the right hand end, the plate 30 has an upward extension, with an upward continuation 27 of the groove 26, at a sharp angle thereto, as well seen in FIGS. 1 and 2. The far edge of the telescopic extension 23 on the chute 21 has a pin 28 which rides in the groove 26 or 27, as the chute swings back and forth.

Pivoted on a pin 31 on the plate 30 is a bell crank lever, one arm 32 of which is normally parallel to the groove 26, as seen in FIG. 1. The other arm 33 extends downwardly and a lateral lug 34 thereon extends into the range of the side wall of the magazine at the front or lower end thereof, so that when the magazine is thrust longitudinally into the space provided for it, the front edge of the magazine will engage the lug 34 and swing the bell crank 32, 33 down in a clockwise direction on the pivot 31, against the action of the spring 40 which tends to raise it. When the bell crank reaches this normal position, it is latched in such position by a latch member 35 pivoted at 36 and urged towards latching position by a spring 37.

The free end of the bell crank arm 32 has a notch 38 as best seen in FIG. 1, adapted to receive the pin 28 on the chute when the chute is swung all the way in a direction toward the rear of the slide magazine. When the chute swings rearwardly so that the pin 28 enters the slot 38, the pin engages a tail 39 on the latch 35 and swings the latch against the force of the spring 37, to an unlatched position. The spring 40 then raises the bell crank arm 32 from the position shown in FIG. 1 to the position shown in FIG. 2. At this time, the pin 28 on the chute is at the junction of the main part 26 of the groove with the upwardly extending part 27 of the groove, so that the raising action of the bell crank arm 32 will carry the pin 28 upwardly with it (since this pin is caught in the notch 38) and the pin 28 will ride up the part 27 of the groove, bringing the parts to the position shown in FIG. 2, telescoping the extension 23 somewhat upwardly along the main chute part 21, and raising the pressure plate part 25 of the chute so that it is brought to a position above the top of the stack of slides and will not interfere with removing the magazine and slides completely from the projector. When a new magazine is thrust longitudinally into the projector, the advancing front edge of the magazine will engage the lug 34 as previously mentioned, swing the bell crank 32 downwardly against the force of the spring 40, thereby bringing the pin 28 of the chute down the part 27 of the groove to the junction thereof with the part 26, whereupon the spring 29 can take over, and move the chute leftwardly until the pressure plate 25 engages the rearmost one of the slides in the chute. When the bell crank 32 reaches its normal position, the latch 35 swings into place and holds it in its normal position, until the magazine is subsequently removed from the projector. The act of pulling the magazine longitudinally out of the projector will automatically move the chute rightwardly when viewed as in FIG. 1, unlatching the latch 35 once more and repeating the operation as above described.

Figure 3:
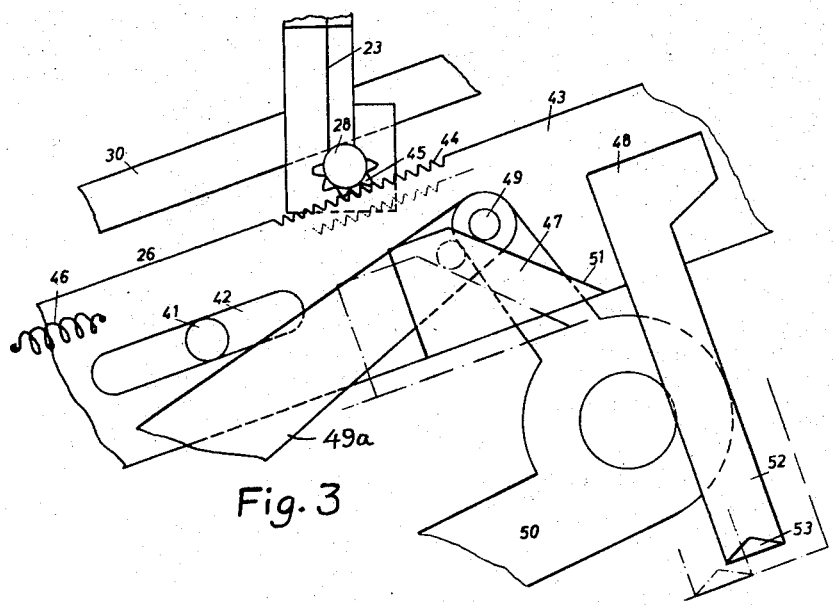
FIG. 3 is a schematic view of the mechanism for displacing the slide return chute, and associated parts, in the normal operative position.
Figure 4:
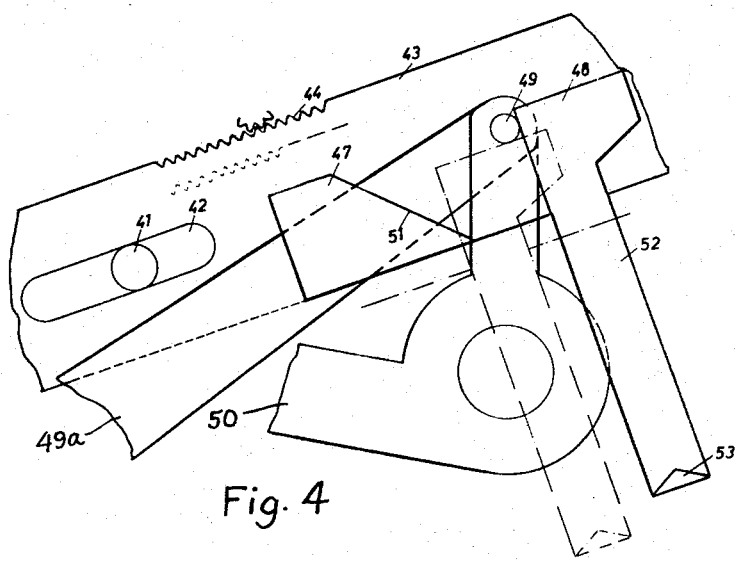
FIG. 4 is a view of the same in the position assumed when inserting the magazine.

In order to make room for the new slide coming down the chute, between the last slide in the stack and the pressure plate 25, it is necessary to move the lower end of the chute rearwardly a slight distance away from the stack 24, just before a new slide drops down the chute. This is done by the mechanism shown in FIGS. 3 and 4. A lever 43 is mounted on the pivot 41 for oscillation thereon and also for limited longitudinal movement thereon to the extent permitted by the length of the slot 42. The mounting pin 41 is on the plate 30. The pin 28 on the chute has teeth on it as shown at 45 in FIGS. 3 and 4. These teeth engage a toothed rack 44 formed along the top edge of the lever 43. A spring 46 connected to the lever 43 tends to move it forwardly (that is, forwardly with respect to the slide magazine, but rearwardly with respect to the projector, since what is here called the front or forward end of the magazine faces toward the rear of the projector itself).

A lever 43 carries two cams 47 and 48, adapted to be engaged by a projecting end of the pivot pin 49 which connects the claw driving link 49a to the claw arm 50. The edge of the cam 47 which cooperates with the pin 49 is inclined at an oblique angle, as shown at 51 in FIGS. 3 and 4.

When the claw arm 50 is swung downwardly to its rest position, the pin 49 engages the sloping cam 51 and cams the lever 43 downwardly in a clockwise direction on its pivot 41, thereby lowering the rack teeth 44 so that they do not engage the teeth 45 on the pin 28. Thus the spring 29 is allowed to draw the chute extension 23 to the left until further leftward movement is stopped by engagement of the pressure plate 25 with the rearmost one of the slides in the magazine. However, when the clam arm 25 is swung clockwise or rightwardly (by rightward motion of the link 49a) to raise the claw to feed the next slide upwardly, then the pin 49 leaves the inclined edge 51 of the cam 47, and presses rightwardly against the upstanding straight edge of the cam 48, thereby moving the entire lever 43 in a rightward direction when viewed as in FIGS. 3 and 4, without causing any downward motion thereof. The spring 46 having meanwhile restored the lever 43 in a counterclockwise direction to engage with the teeth 45 on the pin 28, it follows that the rightward motion of the lever 43 caused by engagement of the pin 49 with the cam 48 will carry the pin 28 rearwardly with it a short distance, opening up a space between the rear one of the slides and the pressure plate 25, into which space the previously projected slide can drop. Then as the claw mechanism moves downwardly again to its normal rest position, the rearward pressure on the cam 48 is relieved, and the pin 49 presses again on the inclined cam 51 to move the lever 43 downwardly out of engagement with the teeth 45, and slightly leftwardly again. The spring 29 is then free to move the lower end of the chute leftwardly again, pressing the entire stack of slides leftwardly in the magazine, so as to keep the first slide always at the extreme left end, ready to be fed upwardly toward projection position when the claw is next operated.

An arm 52 fixed to the lever 43 and projecting downwardly therefrom, has a laterally extending cam 53 at its lower end, in position to underlie the slide magazine as the magazine is inserted into or removed from the projector. During the inserting movement, the magazine presses downwardly on the cam 53, thereby pulling downwardly on the arm 52 and swinging the lever 43 in a clockwise direction on its pivot 41, to remove the rack teeth 44 downwardly from the teeth 45 on the pin 28. Therefore the pin 28 on the chute is free to travel along the slot 26, so the chute may be adjusted to its proper position. Assuming that the claw mechanism is stopped in its highest or elevated position during the magazine insertion or removal operation, the flat top edge of the cam 48 will come under the pin 49 in the position shown in broken lines in FIG. 4, thus holding the lever 43 out of engagement with the gear teeth on the pin 28.

When the slide magazine is fully inserted, the rear or right end of the magazine passes to a position just beyond the cam 53, so the magazine no longer engages this cam. Then the next cycling operation of the claw mechanism will cause the pin 49 to move leftwardly off of the top of the cam 58, allowing the lever 43 to rise so as to engage the teeth on the pin 28, and the parts are now ready for normal projecting operation.

Figure 2:
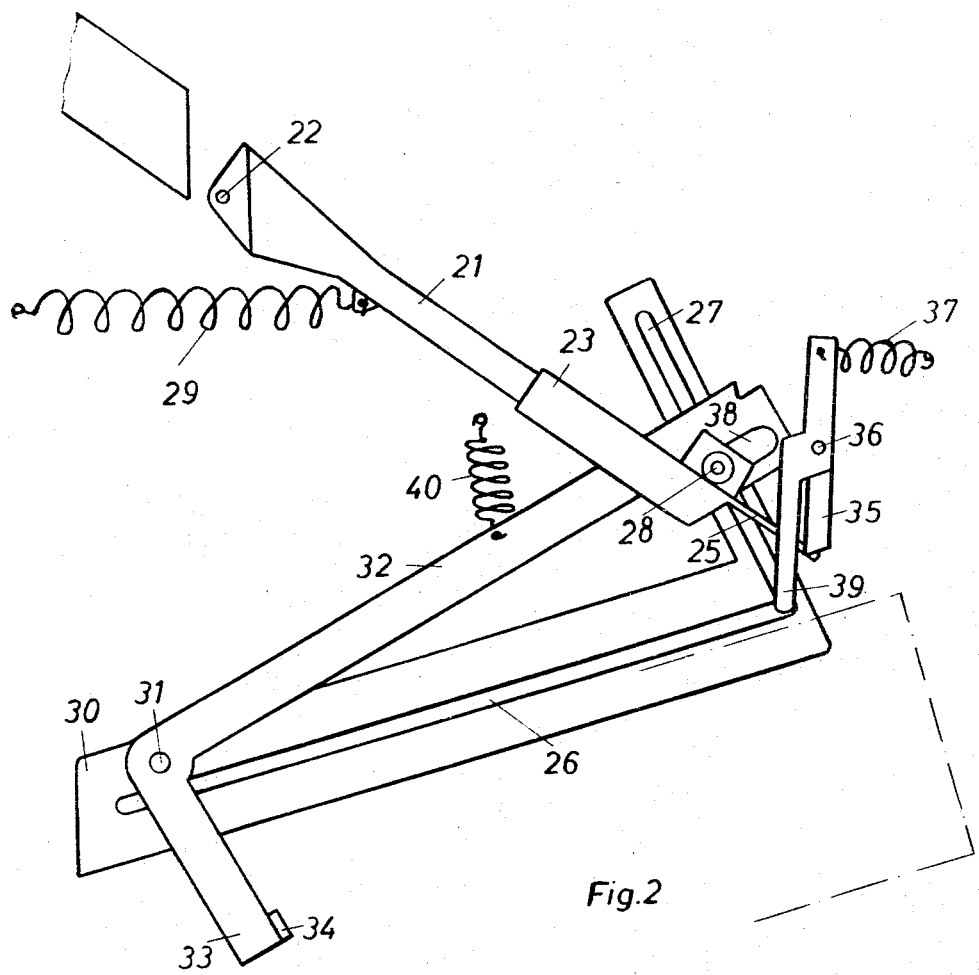
FIG. 2 is a similar view with the parts in the position for changing magazines.

At the beginning of the removal movement of the magazine, assuming again that the claw mechanism is stopped in its upper position, the commencement of the rearward movement of the magazine immediately engages the cam 53, turns the lever 43 clockwise and allows the pin 49 to engage over the top edge of the cam 48, holding the lever 43 disengaged from the pin 28 during the rest of the removal movement of the magazine and the subsequent insertion movement of a new magazine, so that the chute can perform its intended movements which are to be performed during removal or insertion of a magazine, as previously explained in connection with FIGS. 1 and 2.

Figure 5:
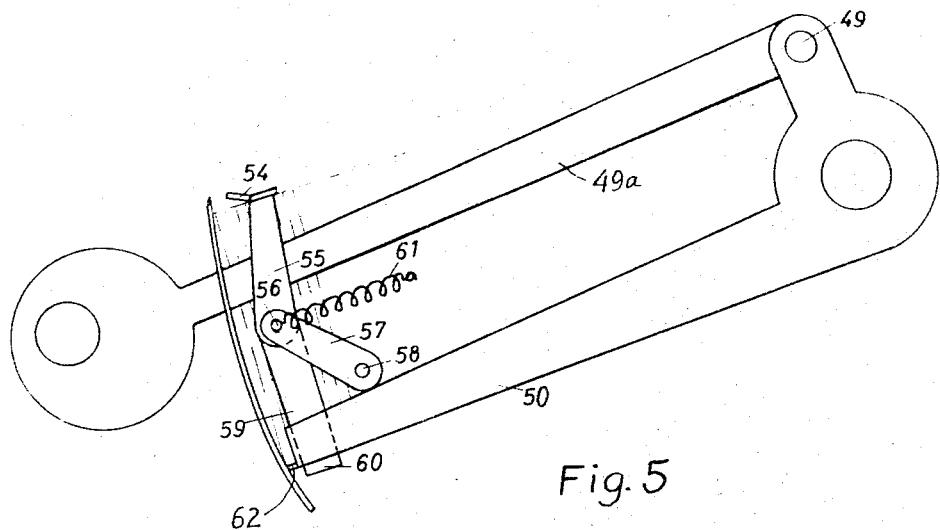
FIG. 5 is a schematic view of the claw for removing the first slide from the stack of slides, to start its travel toward projection position, and of the mechanism for restoring the second slide to proper position if it has been frictionally displaced by the movement of the first slide, these parts being shown in normal rest position.
Figure 6:
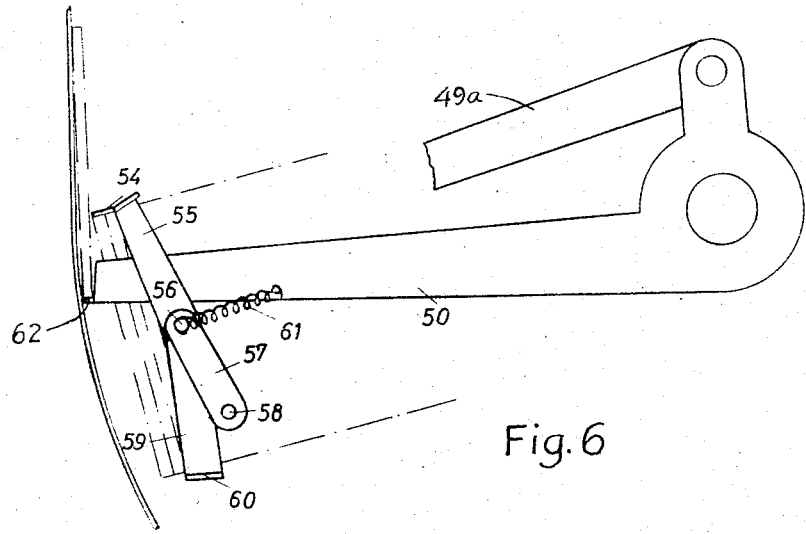
FIG. 6 is a similar view showing the parts during the travel of the claw and the changing of the slide.

As the first slide is fed upwardly by operation of the claw, the next slide to it may be somewhat fed upwardly by friction, particularly if the slides are in the form of cardboard mounts where there is considerable friction between the surfaces of adjacent slides. To avoid this, it is desirable to provide a guard which will hold the second slide in position or restore it to its proper position if it has been slightly displaced therefrom. The guard and associated parts are best seen in FIGS. 5 and 6.

The guard is indicated at 54, and is in the form of a plate extending transversely across the top of the stack of slides in the magazine. Each end of the guard plate 54 is fastened to an arm 55, there being two of these arms, one outside each lateral side wall of the magazine. The arms 55 are pivoted on pins 56 which are crank pins of a pair of crank arms 57 pivoted on stationary pivots 58, one of these arms 57 lying just outside each lateral side wall of the magazine. Another lever 59 is also pivoted on each of the pivots 56 and extends downwardly therefrom, having at its bottom end a bent over lug 60 disposed in the path of downward travel of the claw arm 50 which carries the claw portion 62 for engaging the bottom edge of the first slide to lift it upwardly. A spring 61 tends to move the arm 57 in a clockwise direction, straightening the toggle formed by the members 55 and 57, so that the guard plate 54 is raised slightly above the top edges of the slides in the magazine, so that there will be no friction on the top edges of the slides as they move forwardly down the slope of the inclined magazine, partly by gravity and partly by the urging force of the spring 29.

As the claw arm 50 swings downwardly toward its normal rest position, at the end of a slide feeding operation, the arm 50 engages the lateral lug 60 on the member 59, and pulls the member 59 downwardly, thereby pulling the pivot pin 56 downwardly and pulling the arm 55 downwardly slightly, against the tension of the springs 61, to bring the guard plate 54 down on the top of the first one or two slides now remaining in the magazine, to force the first one down to its intended home position, if it has been accidentally displaced slightly upwardly from such position. As the claw arm 50 starts upwardly during its next cycle of operation, the first part of the upward movement relieves the downward pressure on the lug 60 and arm 59, so that the spring 61 can immediately turn the arm 57 slightly clockwise, raising the arm 55 and guard plate 54 to a position which does not interfere with the upward feeding movement of the first slide, or with the advancing movement of the entire stack of slides by a distance equal to the thickness of one slide.

Any suitable conventional driving mechanism may be used to drive the claw mechanism of the present invention, either by hand or by motor means. For example, motor driving means such as disclosed in Weiss and Finke Patent 3,118,341, granted January 21, 1964, can be easily adapted to driving the present projector. Thus the crank arm 11 (FIGS. 7 and 9) can be driven by a motorized shaft like the shaft 75 of the patent just mentioned, the crank arm being connected by a link 12 or 49a to the claw arm 14 or 50. The shaft would normally turn one complete revolution at each operating cycle, to move the claw arm upwardly through a feeding motion and restore it downwardly to its normal rest position. However, as shown in the patent just mentioned, provision is made for stopping the shaft at the end of a half cycle rather than a full cycle, so that when a magazine is to be inserted or removed, the claw arm will be at the top of its swinging movement, enabling the pin 49 to overlie the top edge of the cam 48 to hold the rack lever 43 disengaged from the teeth 45 on the pin 28, as mentioned above.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic slide projector comprising means for holding a removable slide magazine containing a stack of a variable number of slides, means for raising a single slide from one end of the stack to a projection position above the magazine, a return chute extending in a downward inclination from an upper entrance end to a lower outlet end for guiding a slide after projection thereof downwardly to the opposite end of the stack, and means pivotally mounting said chute near its upper end for oscillation of the lower end thereof in the direction of the length of the magazine.

2. A construction as defined in claim 1, further comprising a spring tending to cause the outlet end of the chute to bear against said opposite end of the stack of slides.

3. A construction as defined in claim 1, wherein at least part of the length of the chute is in the form of a tubular channel.

4. A construction as defined in claim 1, wherein the chute has a lower end portion telescopically movable upwardly and downwardly with respect to the upper portion thereof.

5. A construction as defined in claim 4, further comprising means on the movable lower end portion of the chute forming a pressure plate for bearing against one end of the stack of slides.

6. A construction as defined in claim 1, further comprising means forming a guiding groove having a first portion extending in a direction approximately parallel to the length of the slide magazine and a second portion extending upwardly at a substantial angle thereto, and a pin on the chute engaging in said guiding groove to guide the oscillations of the chute first in a direction lengthwise of the magazine and then upwardly to a position above the magazine.

7. A construction as defined in claim 6, further comprising a chute controlling lever swingable upwardly and downwardly and having a portion for engaging said pin on the chute, spring means tending to move said lever upwardly to carry said pin on said chute up said second upwardly extending portion of said guiding groove when said pin is engaged with said lever, and releasable means for latching said lever in a down position.

8. A construction as defined in claim 7, wherein said latching means is released by moving said pin along said first portion of said guiding groove to the junction with the second upwardly extending portion thereof.

9. A construction as defined in claim 7, further comprising a portion on said chute controlling lever in the path of movement of a slide magazine being inserted in the projector, so arranged that the inserting movement of the magazine will swing the lever downwardly to carry the pin on the chute downwardly along said second portion of the groove to the junction therewith of the first portion.

10. A construction as defined in claim 2, further including means operating in timed relation to said slide raising means for displacing the outlet end of the chute slightly away from said opposite end of the stack of slides, to provide room for receiving a slide coming down said chute.

11. A construction as defined in claim 10, wherein said means for displacing the outlet end of the chute comprises a rack member pivotally mounted for both oscillation and longitudinal movement, rack teeth on said rack member for engaging a part of said chute, cam means on said rack member, and a pin on said slide raising means for engaging said cam means to move said rack member longitudinally to carry said chute along with it during one part of the movement of said slide raising means and to swing said rack member out of driving engagement with said chute during another part of the movement of said slide raising means.

12. A construction as defined in claim 11, further including means on said rack member for engaging a slide magazine during insertion or removal of a magazine to swing said rack member out of engagement with said chute.

13. A construction as defined in claim 1, further including means operated by said slide raising means for pressing down the next slide to the one which has been raised.

14. A construction as defined in claim 13, in which said pressing down means is released during each upward motion of said slide raising means.

15. A photographic slide projector comprising means for projecting a beam of light along an approximately horizontal optical axis, means for holding a removable and interchangeable slide tray beneath said optical axis in a longitudinally inclined position so that said slide tray has an upper end and a lower end, said slide tray being adapted to hold a stack of a variable number of picture slides to be projected, slide guide means extending from a position adjacent the lower end of said tray upwardly to a position intersecting said optical axis and thence on upwardly to a terminal portion above said optical axis, a slide chute extending obliquely downwardly from an upper end adjacent said terminal portion of said guide means to a lower end adjacent said upper end of said tray, and slide pusher means for pushing successive end slides at the lower end of said tray upwardly one by one during successive cycles, from the lower end of the tray into said slide guide means, the parts being so proportioned and arranged that as each fresh slide is pushed upwardly from the tray into the guide means, an upper edge of the fresh slide will press upwardly on a lower edge of the next preceding slide to push such preceding slide upwardly in said guide means, successive cycles of operation of said pusher means being effective to push a given slide up to a projection position intersecting said optical axis and to push the slide preceding said given slide up above said optical axis to said terminal portion of said guide means, whereupon it may travel by gravity down said chute from said terminal portion into said tray.

16. A construction as defined in claim 15, wherein said terminal portion of said slide guide means is so shaped that when a slide reaches said terminal portion, gravity will tend to tilt such slide to disengage a lower edge of such slide from an upper edge of the next lower slide, so that such slide will no longer be supported by the next lower slide and may then travel down said chute.

17. A construction as defined in claim 15, wherein at least a portion of said chute is pivoted on a fixed pivot adjacent an upper end of said portion so that a lower end of said portion may swing in a direction lengthwise of said tray to accommodate itself to varying numbers of picture slides in said tray.

18. A construction as defined in claim 17, further including a presser plate extension mounted on and swinging bodily with said pivoted portion of said chute, for pressing against a last slide in said tray to press said last slide toward said lower end of said tray.

19. A construction as defined in claim 18, further including means operating concomitantly with said slide pusher means for moving said presser plate extension temporarily away from said last slide as said pusher means pushes a fresh slide upwardly in said slide guide means, to provide a space for receiving a slide travelling down said chute to said tray.

20. A construction as defined in claim 18, wherein the act of removing said slide tray from the projector serves to swing said presser plate extension on said chute to a non-obstructing position with respect to said slide tray and the slides therein, and means for latching said presser plate extension in said non-obstructing position until a fresh slide tray is inserted in the projector.

References Cited by the Examiner

UNITED STATES PATENTS

| | | | |
|---|---|---|---|
| 1,096,360 | 5/1914 | Eveleth | 40—36 |
| 1,741,228 | 12/1929 | Garlick | 40—36 |
| 2,862,319 | 12/1958 | Lipfert | 40—36 |
| 2,922,335 | 1/1960 | Lacoe | 88—28 |
| 2,936,672 | 5/1960 | May et al. | 40—78 X |

FOREIGN PATENTS 698,753 11/1940 Germany.

EUGENE R. CAPOZIO, *Primary Examiner.*

W. GRIEB, *Assistant Examiner.*